United States Patent Office 3,488,366
Patented Jan. 6, 1970

3,488,366
THERMAL TREATMENT OF OIL WITH CATALYST
Sukh Dev and Ullal R. Nayak, Poona, India, assignors to the United States of America as represented by the Secretary of Agriculture
No Drawing. Filed Oct. 4, 1967, Ser. No. 672,742
Int. Cl. C07c 61/22, 67/00
U.S. Cl. 260—398                    2 Claims

ABSTRACT OF THE DISCLOSURE

This invention relates to the cyclization of fatty derivatives with conjugated (or potentially conjugated) triene unsaturation. More particularly, this invention relates to the catalyzed thermal intramolecular and intermolecular cyclization of fatty derivatives with conjugated (or potentially conjugated) triene unsaturation.

---

A non-exclusive, irrevocable, royalty-free license in the invention herein described throughout the world for all purposes of the United States Government, with the power to grant sublicenses for such purposes, is hereby granted to the Government of the United States of America.

An object of this invention is to provide a method for forming a monomeric cyclic compound from methyl α-eleostearate and α-tung oil. A further object of this invention is to provide a method for forming this cyclic monomer more efficiently and with a greater yield.

It is well known in the prior art that conjugated systems such as those present in eleostearic acid can undergo the Diels Alder reaction. This reaction involves the 1,4 addition of an unsaturated compound to the terminal carbon atoms of a conjugated diene forming an unsaturated six membered ring compound. Contrary to this reaction, this invention relates to the formation of a cyclic monomer of methyl α-eleostearate by heating said compound in the presence of a sulfur catalyst.

The chief fatty acid component of tung oil is α-eleostearic acid. This acid is present as an ester of glycerol. These esters are capable of undergoing ester interchange or ester exchange. In this invention, the glycerol ester of α-eleostearic acid reacts with methanol (present in large amounts) in the presence of a catalyst to form methyl α-eleostearate. Heating this ester at high temperature and in the presence of a catalyst (sulfur, selenium, or any derivative of these elements capable of generating these under experimental conditions, such as sulfides or selenides) results in the formation of the cyclic monomer, methyl 5-butyl 1,3-cyclohexadiene-6-caprylate, the first cyclic monomer formed on heating eleostearate.

EXAMPLE 1

Methyl α-eleostearate ($a_{270}$=140), prepared by methanalysis of tung oil containing 70% eleostearic acid, 66 gm., and sublimed sulfur flowers, 132 mg., were taken in a pyrex glass tube (160 mm.×32 mm.) and sealed under vacuum (0.5 mm.). Three such tubes were immersed in a preheated silicone oil bath held at 250° C. Upon immersion of the tubes, the temperature fell to 225° C. and was rapidly raised to 240° C. during the next ten minutes and maintained at that temperature for fifty minutes more for a total heating period of one hour.

The combined thermal products were distilled in a 2-inch rotafilm molecular still at 160° C./500μ yielding a monomeric distillate (130 g.) as a colorless mobile oil ($a_{264}$=8.5) and a reddish yellow viscous liquid as a residue. The latter on redistillation at 250° C./30μ gave the dimer (39 g.:~20%) as a golden yellow oil.

The distillate monomer (130 g.) was adducted with urea, 300 g., dissolved in 1.5 liters of methanol at 50° C. After one hour at room temperature and 14 hours at 0° C., the urea complex was filtered, washed thoroughly with urea saturated methanol, 200 ml., and the filtrate taken to dryness on the waterbath. The residue was treated with 700 ml. of water, extracted with ether (150 ml.×4) and washed with water (50 ml.×2), dried over anhydrous sodium sulphate and evaporated to a very light oil (87 g.) which on distillation in a rotofilm still at 140° C./100μ yielded the cyclic monomer as a colorless liquid. IR spectrum: No eleostearate absorption in the 1000 cm.$^{-1}$ region; UV spectrum: No triene triple absorption but only a single broad peak at 264 mμ, ($a.$=11.5).

EXAMPLE 2

α-tung oil ($a_{270}$=123), 66 g., and sublimed sulfur, 132 mg., were taken in a pyrex glass tube and sealed as in Example 1. Two such tubes were heated at 240° C. for 1 hour as in Example 1. In the absence of sulfur, the oil gelled on heating. In the presence of the catalyst, a thick liquid was obtained with no evidence of gel formation.

The heated oil (with catalyst) was subject to methanalysis using sodium, 0.8 g., dissolved in 60 ml. of methanol at water bath temperature for 1.5 hours. After removal of the glycerol layer from the cooled reaction product, it was washed with dilute (10%) HCl, then with water (50 ml.×5) and dried. Distillation in the rotofilm still at 160° C./400μ gave the monomeric distillate, 81 g., ($a_{265}$=9.3) as a colorless oil and a reddish yellow viscous liquid as a residue which on subsequent distillation at 260° C./50μ yields the dimer, 26 g., as a golden yellow oil.

Table 1 shows the results obtained when the cyclized tung oil was compared with polyester P as a stationary phase in GLC.

TABLE I.—PERFORMANCE OF CYCLISED TUNG OIL AND POLYESTER COLUMNS AS STATIONARY PHASES FOR GLC

| Column (6′ x ¼″) 20% on Chromosorb W | α-Pinene | β-Pinene | 3-carene | Longi-cyclene | Iso-longi-folene | Longi-folene | Ethyl-benzene | m-Xylene | p-Xylene | o-Xylene |
|---|---|---|---|---|---|---|---|---|---|---|
| Cyclized Tung Oil: | | | | | | | | | | |
| R | 2.21 | 3.47 | 4.33 | 4.38 | 5.12 | 5.45 | 5.14 | 6.08 | 6.08 | 7.33 |
| C | 100° C., 15 p.s.i. | | | 170° C., 15 p.s.i. | | | | 70° C., 15 p.s.i. | | |
| Polyester "P": | | | | | | | | | | |
| R | 0.37 | 1.19 | 1.57 | 1.28 | 1.28 | 2.06 | 2.26 | 2.26 | 2.26 | 3.35 |
| C | 60° C., 15 p.s.i. | | | 130° C., 15 p.s.i. | | | | 70° C., 10 p.s.i. | | |

R, Retention time in minutes and seconds.
C, GLC conditions.

The structure of the cyclic monomer (readily accessible by sulfur catalyzed thermal cyclisation of methyl α-eleostearate) as methyl 5-butyl 1,3-cyclohexadiene-6-caprylate has been proven by unequivocal chemical evidence. The tactical retro Diels-Alder reaction of this cycloeleostearate with acetylene dicarboxylic acid dimethyl ester furnished dimethyl phthalate

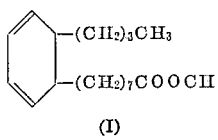

(I)

and another fragment which on hydrogenation and hydrolysis produced myristic acid (identified by standard methods) which pointers are compatible only with structure (1). The formation of methyl eleostearate by irradiation of (1) with ultraviolet light is additional photochemical evidence for the correctness of (1). Other reactions studied include ozonalysis and preparation of maleic anhydride adduct and its transformation products for comparison of their spectral data (especially NMR) with the corresponding compounds derived from methyl α-eleostearate. Compound (1) has been characterized by the preparation of a crystalline adduct (M.P. 143° C.) by reaction with p-phenylazomaleinanil. The carbonylic dienophile formaldehyde failed to adduct with the cyclic monomer under the conditions used for this reaction with levopimaric acid as the substrate.

We claim:
1. A process for producing a monomeric cyclic compound from methyl α-eleostearate whereby the process consists of:
 (a) heating 1 part of methyl α-eleostearate and 0.002 parts of sulfur, sealed under vacuum of about 0.5 mm., for a period of about 1 hour at a temperature of about 240° C.,
 (b) distilling the combined thermal products at 160° C./500μ
 (c) treating the distillate with a solution consisting of 300 g. of urea dissolved in 1.5 liters of methanol for a period of about 1 hour at a temperature of about 50° C. and for a period about 14 hours at a temperature of about 0° C.,
 (d) separating the urea complex and washing said complex with urea saturated methanol,
 (e) evaporating the combined filtrate and washings to dryness,
 (f) treating the residue with water,
 (g) extracting with four portions of ether,
 (h) washing with two portions of water,
 (i) drying over anhydrous sodium sulphate,
 (j) evaporating to a very light oil,
 (k) distilling at 140° C./100μ.

2. A process for producing a monomeric cyclic compound from α tung oil whereby the process consists of:
 (a) heating 1 part of α tung oil, containing at least 70% eleostearic acid, with 0.002 parts of sulfur, sealed under vacuum of about 0.5 mm., for a period of about 1 hour at a temperature of about 240° C.,
 (b) reacting the heated oil with an excess amount of methanol in which 0.8 g. of sodium had been dissolved for a period of about 1.5 hours at a temperature of about 100° C.,
 (c) separating the glycerol layer from the cooled reaction product,
 (d) washing the reaction product with one portion of 10% HCl and with five portions of water,
 (e) distilling at 160° C./400μ.

References Cited
UNITED STATES PATENTS 2,152,642 4/1939 Harper _____ 260—407
2,868,815 1/1959 Baldwin et al. _____ 260—413

ELBERT L. ROBERTS, Primary Examiner